(12) United States Patent
Xu et al.

(10) Patent No.: US 10,459,643 B2
(45) Date of Patent: Oct. 29, 2019

(54) METHOD AND APPARATUS FOR STORAGE SYSTEM

(71) Applicant: EMC IP Holding Company LLC, Hopkinton, MA (US)

(72) Inventors: Sherry Hongru Xu, Shanghai (CN); Brian Tianfang Xiong, Shanghai (CN); Yifeng Lu, Shanghai (CN); Alex Minghui Zhang, Shanghai (CN); Luna Yue Kuang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/461,450

(22) Filed: Mar. 16, 2017

(65) Prior Publication Data

US 2017/0269859 A1   Sep. 21, 2017

(30) Foreign Application Priority Data

Mar. 16, 2016 (CN) .......................... 2016 1 0150685

(51) Int. Cl.
*G06F 12/00* (2006.01)
*G06F 3/06* (2006.01)
*G06F 11/20* (2006.01)

(52) U.S. Cl.
CPC ............ *G06F 3/0619* (2013.01); *G06F 3/065* (2013.01); *G06F 3/067* (2013.01); *G06F 3/0617* (2013.01); *G06F 3/0665* (2013.01); *G06F 3/0689* (2013.01); *G06F 11/2082* (2013.01); *G06F 11/2097* (2013.01); *G06F 11/2058* (2013.01); *G06F 11/2069* (2013.01); *G06F 11/2094* (2013.01)

(58) Field of Classification Search
CPC .......................... G06F 3/0619; G06F 11/2082
See application file for complete search history.

(56) References Cited

U.S. PATENT DOCUMENTS

| 8,600,945 | B1 * | 12/2013 | Natanzon | ................ G06F 11/20 707/648 |
| 8,725,691 | B1 * | 5/2014 | Natanzon | ............ G06F 11/2074 707/640 |
| 9,405,481 | B1 * | 8/2016 | Cohen | ................... G06F 3/0619 |

(Continued)

FOREIGN PATENT DOCUMENTS

| CN | 1823324 | 8/2006 |
| CN | 103842954 | 6/2014 |

(Continued)

*Primary Examiner* — Ryan Bertram
*Assistant Examiner* — Trang K Ta
(74) *Attorney, Agent, or Firm* — BainwoodHuang

(57) ABSTRACT

The present disclosure provides a method and an apparatus for a storage system. The storage system includes an active storage site and a standby storage site, and a logical unit number LUN for a storage pool of the active storage site is replicated to a LUN for a storage pool of the standby storage site to form a consistency group. The method comprises: creating a first LUN and a second LUN as mirrors of each other at the active storage site and the standby storage site, respectively; adding the mirrors formed by the first LUN and the second LUN to the consistency group; after the second LUN is added to the storage pool of the standby storage site, adding the first LUN to the storage pool of the active storage site.

20 Claims, 8 Drawing Sheets

(56) References Cited

U.S. PATENT DOCUMENTS

| | | | |
|---|---|---|---|
| 9,535,630 | B1 | 1/2017 | Bono et al. |
| 9,582,382 | B1 * | 2/2017 | Natanzon ............ G06F 11/2069 |
| 9,940,332 | B1 | 4/2018 | Zhou et al. |
| 9,942,326 | B1 | 4/2018 | Faibish et al. |
| 10,061,674 | B1 | 8/2018 | Marchant et al. |
| 10,089,202 | B1 | 10/2018 | Gaurav et al. |
| 2006/0069865 | A1 * | 3/2006 | Kawamura ......... G06F 11/2064 |
| | | | 711/114 |

FOREIGN PATENT DOCUMENTS

| | | |
|---|---|---|
| CN | 104317675 | 1/2015 |
| CN | 104836833 | 8/2015 |

\* cited by examiner

METHOD AND APPARATUS FOR STORAGE SYSTEM

RELATED APPLICATIONS

This application claim priority from Chinese Patent Application Number CN201610150685.7, filed on Mar. 16, 2016 at the State Intellectual Property Office, China, titled "METHOD AND APPARATUS FOR STORAGE SYSTEM," the contents of which is herein incorporated by reference in its entirety

FIELD

The present disclosure generally relates to storage technologies, and more particularly, to a method and an apparatus for a storage system.

BACKGROUND

In a disaster recovery technical environment for a storage system, there might exist multiple File level remote replication sessions, which replicate data from an active storage site to a standby storage site. While the data keeps growing, a storage pool such as the NAS User-defined pool protected by this remote replication session nearly reaches its space limit. Therefore, when the storage pool of the active storage site is close to its space limit, it is necessary to extend the space of the storage pool and desire to keep the remote replication session functioning while extending the space of the storage pool.

In approaches in the prior art, it is necessary to first delete existing replication session on the storage pool, then extend the storage pool on both active and standby storage sites, and then re-create the replication session. Since it may take days or even weeks for a synchronization process of a new replication session after its creation, after the previous replication session is deleted and before the new replication session is synchronized, there is no protection on user data for a rather long time period. If a disaster happens during this phase, there will be data loss.

SUMMARY

In view of the above technical problems existing in the prior art, one of objectives of embodiments of the present disclosure is to provide a method and an apparatus for a storage system, to solve at least one of the above technical problems existing in the prior art.

According to a first aspect of the present disclosure, there is provided a method for a storage system. The storage system includes an active storage site and a standby storage site. A logical unit number (LUN) for a storage pool of the active storage site is replicated to a LUN for a storage pool of the standby storage site to form a consistency group. The method includes: creating a first LUN and a second LUN as mirrors of each other at the active storage site and the standby storage site, respectively; adding the mirrors formed by the first LUN and the second LUN into the consistency group; after the second LUN is added into the storage pool of the standby storage site, adding the first LUN into the storage pool of the active storage site.

In some embodiments, the method may further include: in response to the active storage site becoming unavailable, changing an originally active LUN in the consistency group to be a standby LUN and changing an originally standby LUN to be an active LUN.

In some embodiments, the method may further include: before adding the mirrors formed by the first LUN and the second LUN into the consistency group, determining that the first LUN and the second LUN are synchronized.

In some embodiments, the method may further include: before adding the second LUN into the storage pool of the standby storage site, determining that the mirrors have been added into the consistency group.

In some embodiments, the method may further include: before adding the first LUN into the storage pool of the active storage site, determining that the second LUN has been added into the storage pool of the standby storage site.

In some embodiments, the storage system may be a network-attached storage (NAS) system.

In some embodiments, the storage pools may include at least one of: a virtual NAS server, a file system, a snapshot, and a network configuration.

According to a second aspect of the present disclosure, there is provided an apparatus for a storage system. The storage system includes an active storage site and a standby storage site. A logical unit number (LUN) for the storage pool of the active storage site is replicated to a LUN for the storage pool of the standby storage site to form a consistency group. The apparatus includes: a creating unit configured to create a first LUN and a second LUN as mirrors of each other at the active storage site and the standby storage site, respectively; and an adding unit configured to add the mirrors formed by the first LUN and the second LUN into the consistency group, the adding unit being further configured to, after the second LUN is added into the storage pool of the standby storage site, add the first LUN into the storage pool of the active storage site.

According to a third aspect of the present disclosure, there is provided a computer-readable storage medium. The computer-readable storage medium has computer-readable program instructions stored thereon, and these computer-readable program instructions are used for performing the method according to the first aspect of the present disclosure.

According to a fourth aspect of the present disclosure, there is provided a storage system. The storage system includes the apparatus according to the second aspect of the present disclosure.

As compared with the approaches in the prior art, the method and apparatus for the storage system according to the present disclosure may at least achieve the following technical advantages. First, the existing replication session may be kept functioning while extending the storage pool. Second, in any technical scenario of each phase of the procedure of extending the storage pool, data loss will not happen on the storage pool protected by the replication session.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

DETAILED DESCRIPTION OF EMBODIMENTS

The principles and spirit of the present disclosure are described below with reference to several example embodiments shown in the figures. It should be appreciated that these embodiments are only intended to enable those skilled in the art to better understand and implement the present disclosure, not to limit the scope of the present disclosure in any manner.

Figure 1:
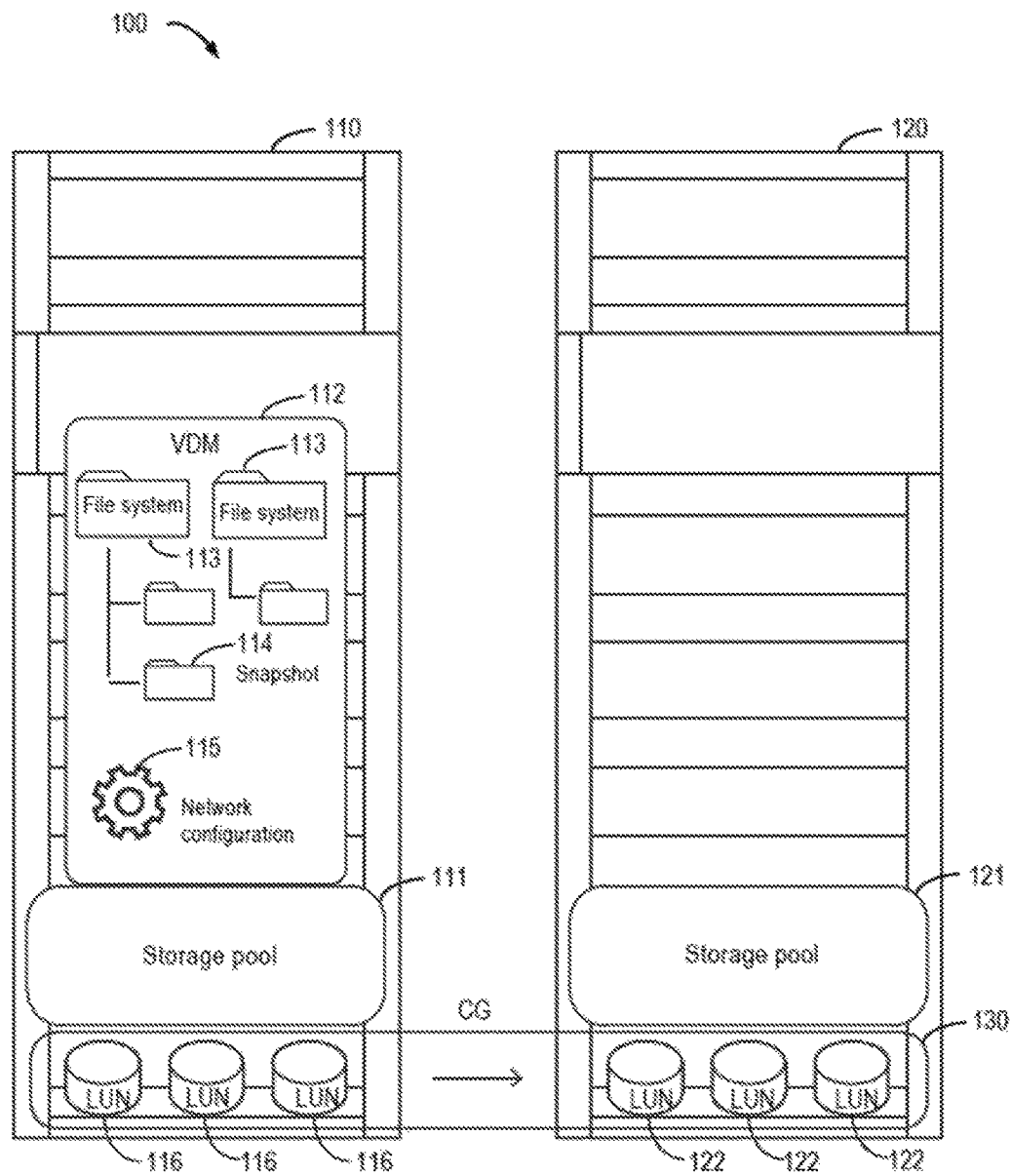
FIG. 1 schematically illustrates a diagram of a remote replication session for a storage system.

FIG. 1 schematically illustrates a diagram of a remote replication session for a storage system 100. In FIG. 1, a file level remote replication session is generally described by taking a network-attached storage NAS system as an example, but those skilled in the art my understand that the embodiments of the present disclosure may be equivalently applied to other storage systems.

As shown FIG. 1, the storage system 100 includes an active storage site 110 and a standby storage site 120. The active storage site 110 and the standby storage site 120 include storage pools 111 and 121, respectively. At the active storage site 110, a virtual NAS server (e.g., VDM) 112, together with all its file systems 113, snapshots 114 and network configurations 115 etc., may be grouped into the storage tool 111. In the replication session from the active storage site 110 to the standby storage site 120, data LUNs 116 for the storage pool 111 may be replicated to data LUNs 122 for the storage pool 121 of the standby storage site 120 by using a Consistency Group (CG) 130, wherein the consistency group technique is a block level replication technique.

In the case that the active storage site 110 becomes unavailable due to a factor such as occurrence of a disaster, the storage system 100 may read metadata stored in replica of the standby storage site 120, switch the roles in the Consistency Group (CG) 130, re-create the NAS objects (VDM, file systems, etc.) on the data LUNs 122 of the standby storage site 120, and seamlessly provide NAS service to the NAS clients originally connected to the storage site 110. However, when the storage pool 111 on the active storage site 110 nearly reaches its space limit, it may be desirable to extend the storage pool 111 and possibly extend the storage pool 121 of the standby storage site 120, while the remote replication session is still working.

Figure 2:
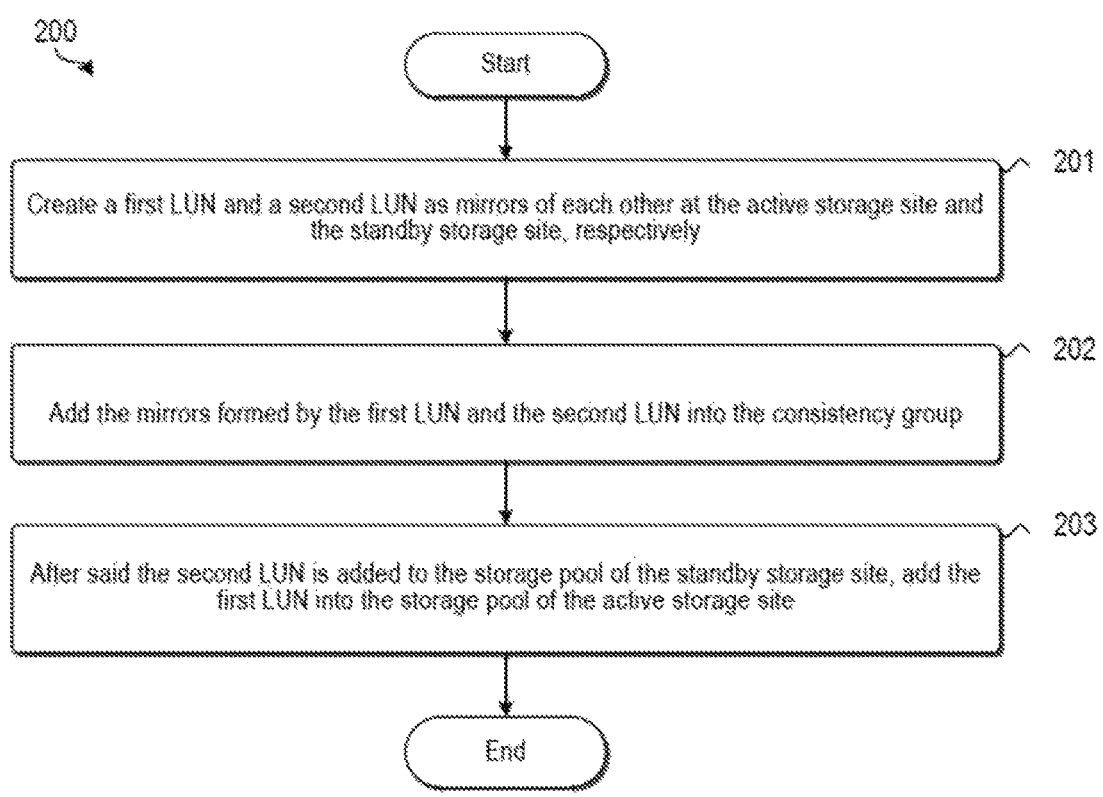
FIG. 2 schematically illustrates a flow chart of a method for a storage system according to an embodiment of the present disclosure.

FIG. 2 schematically illustrates a flow chart 200 of a method for a storage system according to an embodiment of the present disclosure. The storage system to which the method 200 is directed includes an active storage site and a standby storage site. A logical unit number LUN for the storage pool of the active storage site is replicated to a LUN for the storage pool of the standby storage site to form a consistency group. In some embodiments, the method 200 may be performed by an apparatus 400 for the storage system described later in combination with FIG. 4.

As shown in FIG. 2, the method 200 may enter step 201 after the start. In step 201, a first LUN and a second LUN as mirrors of each other are created at the active storage site and the standby storage site, respectively. The step 201 of the method 200 is described in more detail in conjunction with FIG. 3A.

Figure 3A:
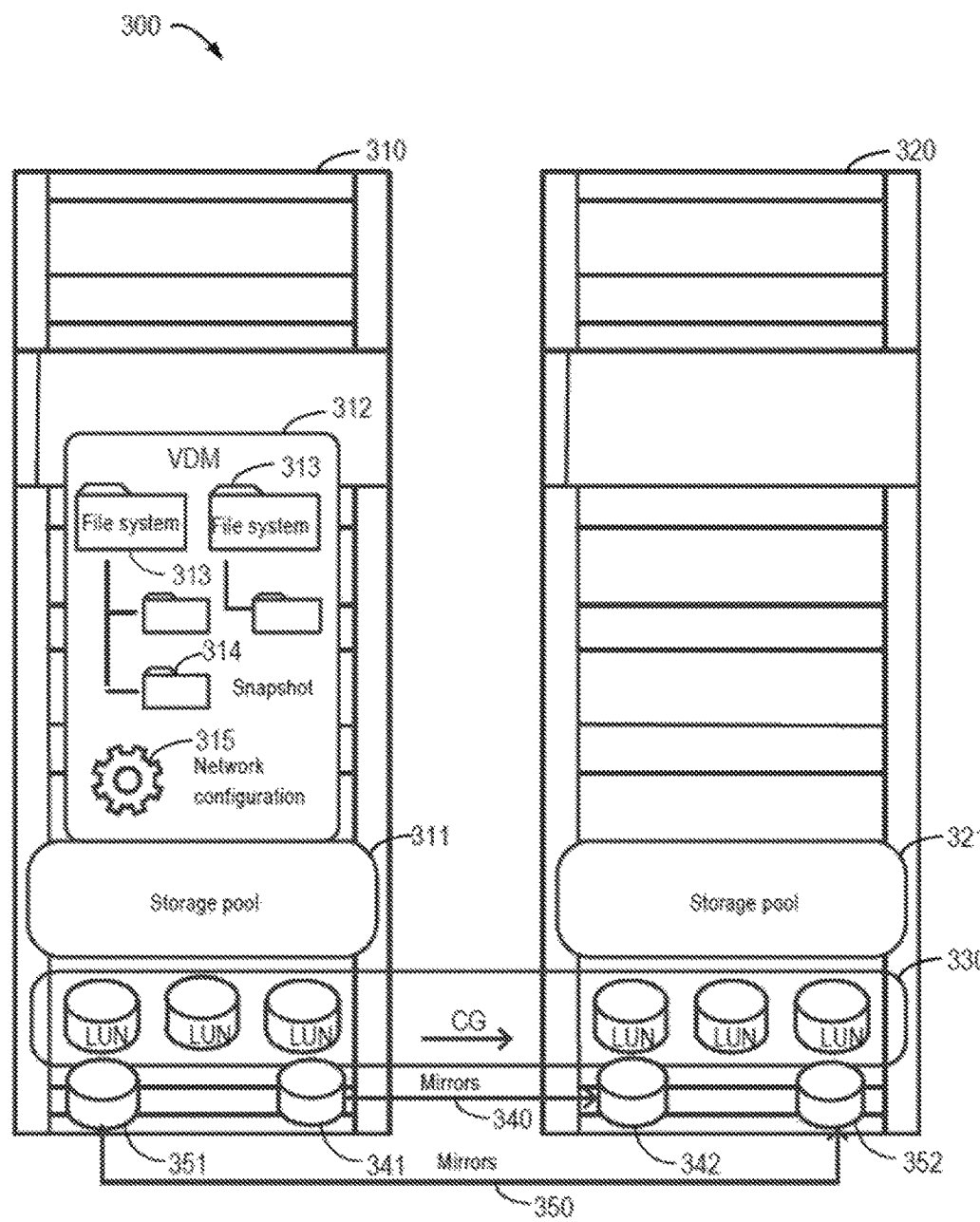
FIG. 3A schematically illustrates a diagram of creating LUN mirrors at an active storage site and a standby storage site according to an embodiment of the present disclosure.

FIG. 3A schematically illustrates a diagram of creating LUN mirrors at an active storage site and a standby storage site according to an embodiment of the present disclosure. As shown in FIG. 3A, an active storage site 310 and a standby storage site 320 include storage pools 311 and 321, respectively. In addition, the active storage site 310 may further include a virtual NAS server (e.g., VDM) 312 and all its file systems 113, snapshots 114 and network configurations 115 etc. A consistency group CG 330 is formed between the active storage site 310 and the standby storage site 320.

In a technical scenario of a remote replication session for the storage system 300, in order to extend the space of the storage pool 311 of the active storage site 310 and the space of the storage pool 321 of the standby storage site 320, block storage LUN mirrors 340 and 350 may be created in the storage system 300, and then the LUN mirrors 340 and 350 wait for completing an initial replication. As shown in FIG. 3A, the LUN mirror 340 is formed by a LUN 341 at the active storage site 310 and a LUN 342 at the standby storage site 320, and the LUN mirror 350 is formed by a LUN 351 at the standby storage site 310 and a LUN 352 at the standby storage site 320.

When the active storage site 310 becomes unavailable due to a factor such as occurrence of a disaster, the storage system 300 will switch roles in the consistency group CG 330, including roles in each pair of mirror LUNs in the CG 330. The originally active storage site 310 will become standby, and the originally standby storage site 320 will become active, and vice versa.

If a disaster happened in the active storage site 310 in the phase of step 201 of the method 200, there is no influence on the existing replication session because LUN mirrors 340 and 350 have not yet been added into the consistency group CG 330. It should be appreciated that FIG. 3A, for illustration purpose, shows only two LUN mirrors 340 and 350 as an example, but in other embodiments, more or less LUN mirrors are also possible.

Returning to FIG. 2, after step 201, the method 20X) may enter step 202. At step 202, mirrors formed by the first LUN and the second LUN are added into the consistency group. The step 202 of the method 200 is described in more detail in conjunction with FIG. 3B.

Figure 3B:
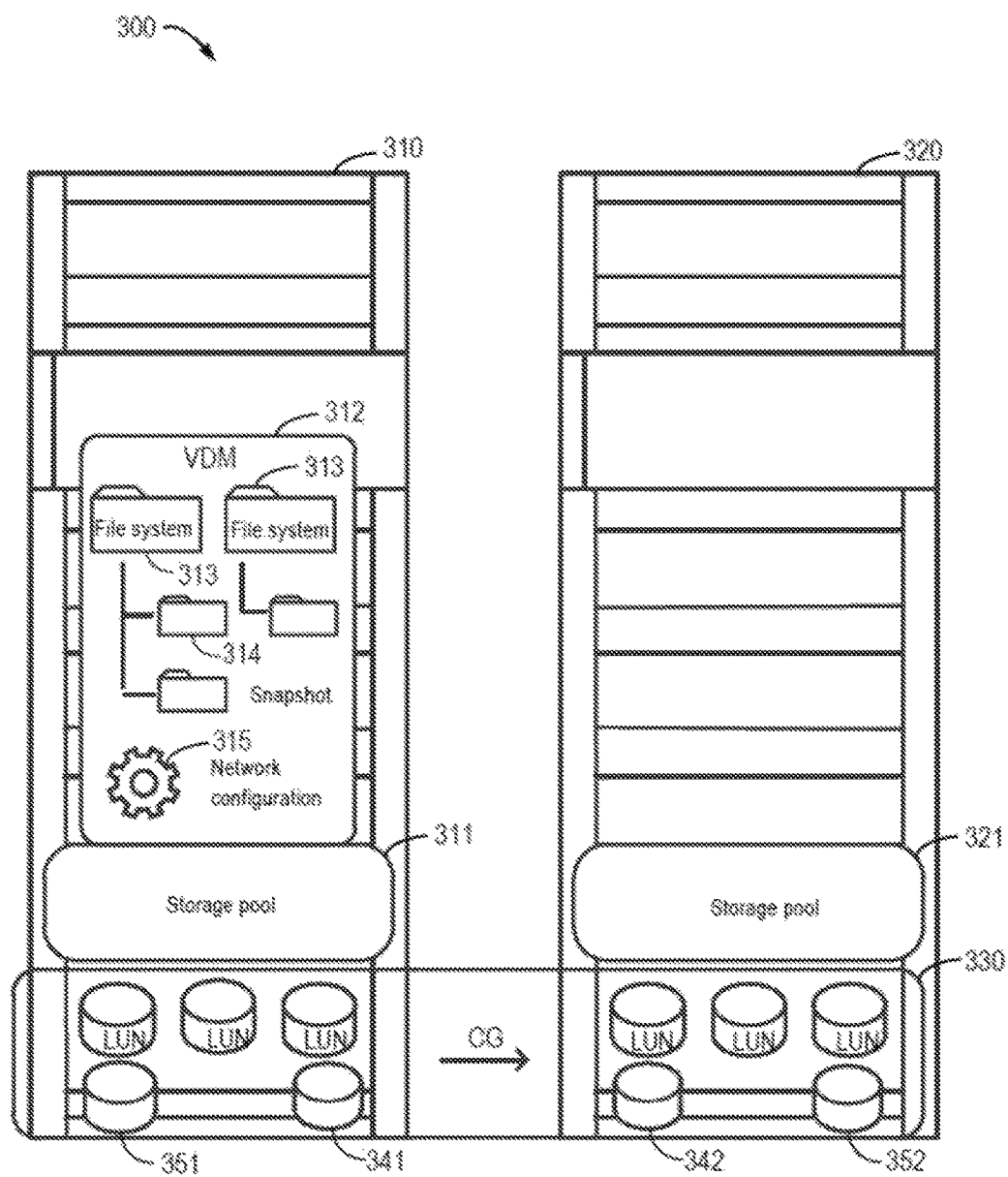
FIG. 3B schematically illustrates a diagram of adding the created mirrors to a consistency group according to an embodiment of the present disclosure.

FIG. 3B schematically illustrates a diagram of adding the created mirrors to a consistency group according to an embodiment of the present disclosure. As shown in FIG. 3B, the LUN mirrors 340 and 350 are added to block storage consistency group CG 330. In other words, the LUN 341 at the active storage site 310 and the LUN 342 at the standby storage site 320, as well as the LUN 351 at the active storage site 310 and the LUN 352 at the standby storage site 320 are added into the consistency group CG 330.

After newly-created LUN mirrors 340 and 350 complete synchronization and are added into the consistency group CG 330, if the active storage site 310 becomes unavailable due to a factor such as occurrence of a disaster, roles of the LUN mirrors 340 and 350 will be switched together with other LUN mirrors in the consistency group CG 330.

In addition, the LUN mirrors 340 and 350 may be synchronized before being added into the consistency group CG 330, otherwise the storage system 330 may reject the addition, to ensure the consistency group CG 330 can be operated properly during disaster recovery.

Therefore, in some embodiments, the method 200 may further include: before adding the mirrors formed by the first LUN and the second LUN into the consistency group, determining the first LUN and the second LUN are synchronized.

Returning to FIG. 2, after step 202, the method 200 may enter step 203. At step 203, after the second LUN is added into the storage pool of the standby storage site, the first LUN is added into the storage pool of the active storage site. The step 203 of the method 200 is described in more detail in conjunction with FIGS. 3C and 3D.

Figure 3C:
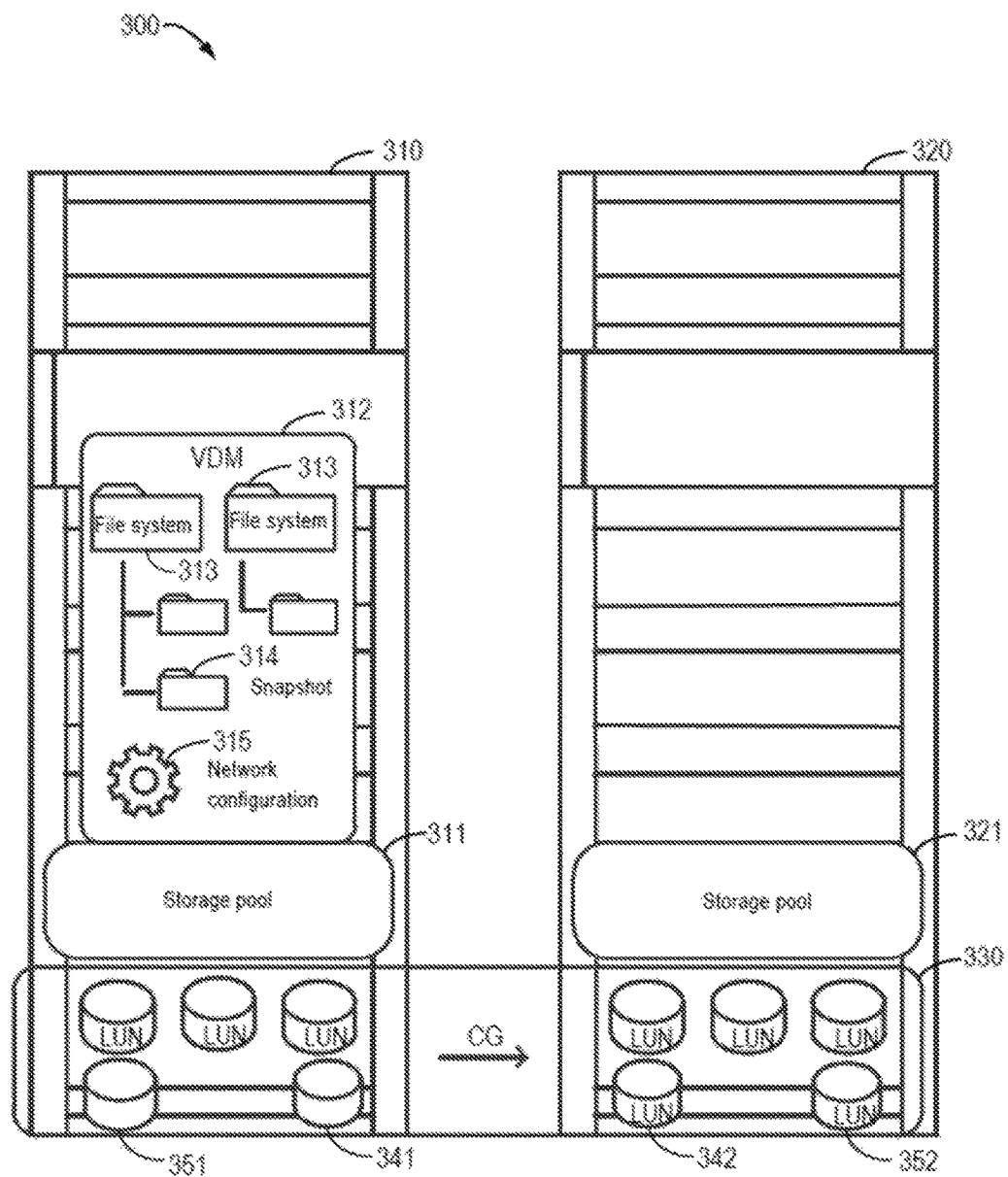
FIG. 3C schematically illustrates a diagram of extending a storage pool of the standby storage site according to an embodiment of the present disclosure.

FIG. 3C schematically illustrates a diagram of extending a storage pool of the standby storage site according to an embodiment of the present disclosure. As shown in FIG. 3C, the storage pool 321 of the standby storage site 320 may firstly be extended. That is, the LUNs 342 and 352 in the LUN mirrors 340 and 350 are added into the storage pool 321 of the standby storage site 320.

It is noted that user data can write to the LUNs 342 and 352 only after the LUNs 342 and 352 are added into the storage pool 321. After the LUNs 342 and 352 are added into the storage pool 321 of the standby storage site 320, since there is no user's write operation at the standby storage site 320, if there is a disaster happened in the active storage site 310 after this phase, there will not be any data loss.

In addition, the storage system 300 may ensure that before extending the storage pool 321 of the standby storage site 320, the LUNs 342 and 352 are added into the consistency group CG 330 of the synchronized replication session. Hence, in some embodiments, the method 200 may further include: before adding the second LUN into the storage pool of the standby storage site, determining that the mirrors have been added into the consistency group.

Figure 3D:
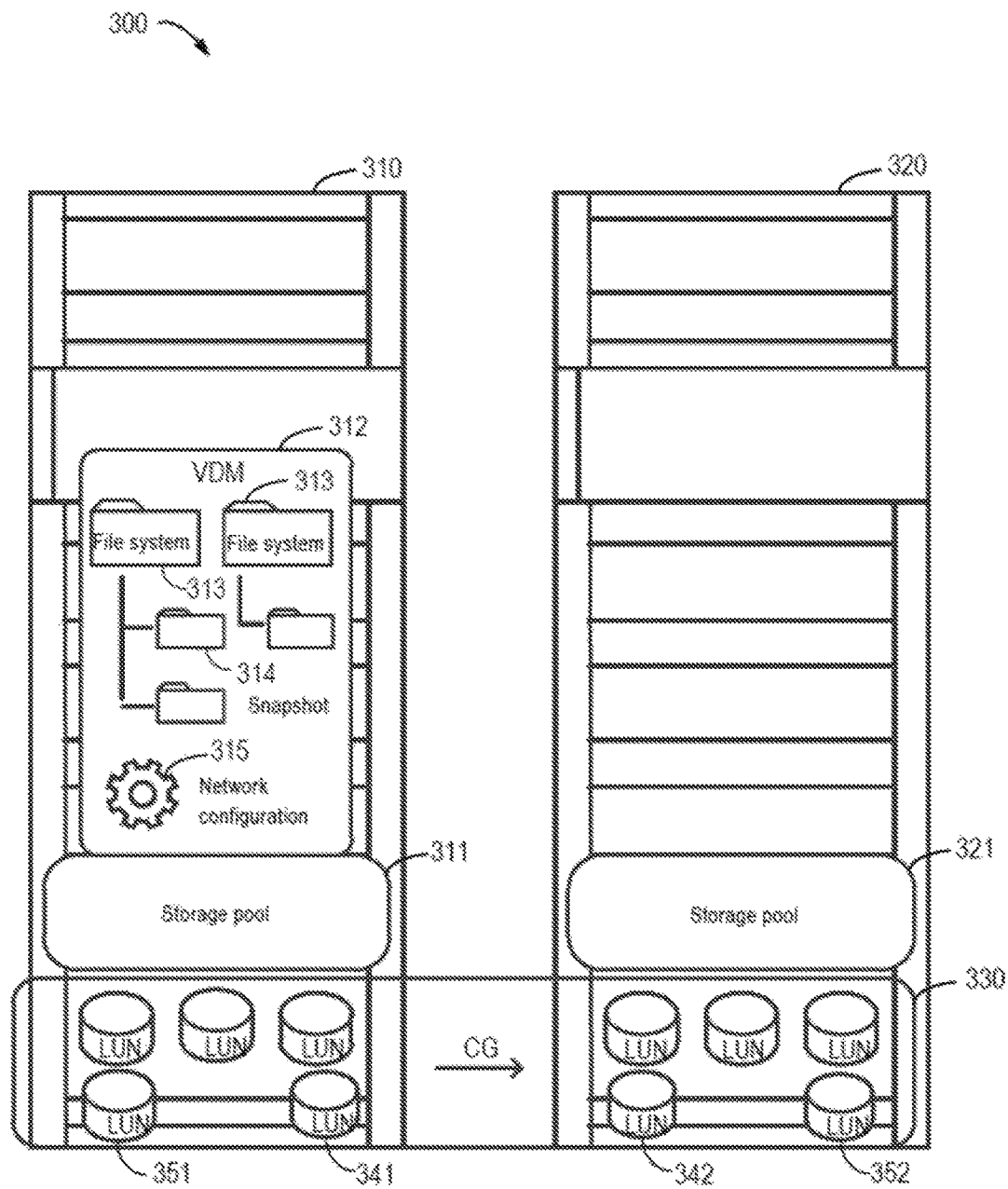
FIG. 3D schematically illustrates a diagram of extending a storage pool of the active storage site according to an embodiment of the present disclosure.

FIG. 3D schematically illustrates a diagram of extending a storage pool of the active storage site according to an embodiment of the present disclosure. As shown in FIG. 3D, after the extension of the storage pool 321 of the standby storage site 320 is completed, the storage pool 311 of the active storage site 310 may be extended. That is, the LUNs 341 and 351 in the LUN mirrors 340 and 350 are added into the storage pool 311 of the active storage site 310.

After the LUNs 341 and 351 are added into the storage pool 311 of the active storage site 310, the user data can be written to the LUNs 341 and 351. Furthermore, since the mirror LUNs 342 and 352 of the LUNs 341 and 351 at the side of the standby storage system 320 are synchronized with the LUNs 341 and 351, if there is a disaster happened in the active storage site 310 during this phase, there will not be any data loss.

In addition, the storage system 300 may check that the storage pool 321 of the standby storage system 320 is firstly extended to ensure that after the storage pool 311 of the active storage system 310 is extended, if there is a disaster happened, there will not be potential data loss. Hence, in some embodiments, the method 200 may further include: before adding the first LUN into the storage pool of the active storage site, determining that the second LUN has been added into the storage pool of the standby storage site.

In some embodiments according to the present disclosure, the method 200 may further include: in response to the active storage site 310 becoming unavailable, changing an originally active LUN in the consistency group 330 to be a standby LUN and changing an originally standby LUN to be an active LUN.

In some embodiments, the storage system 300 may be a network-attached storage NAS system. In some embodiments, the storage pools 311 and 321 may include at least one of: a virtual NAS server, a file system, a snapshot, and a network configuration.

Figure 4:
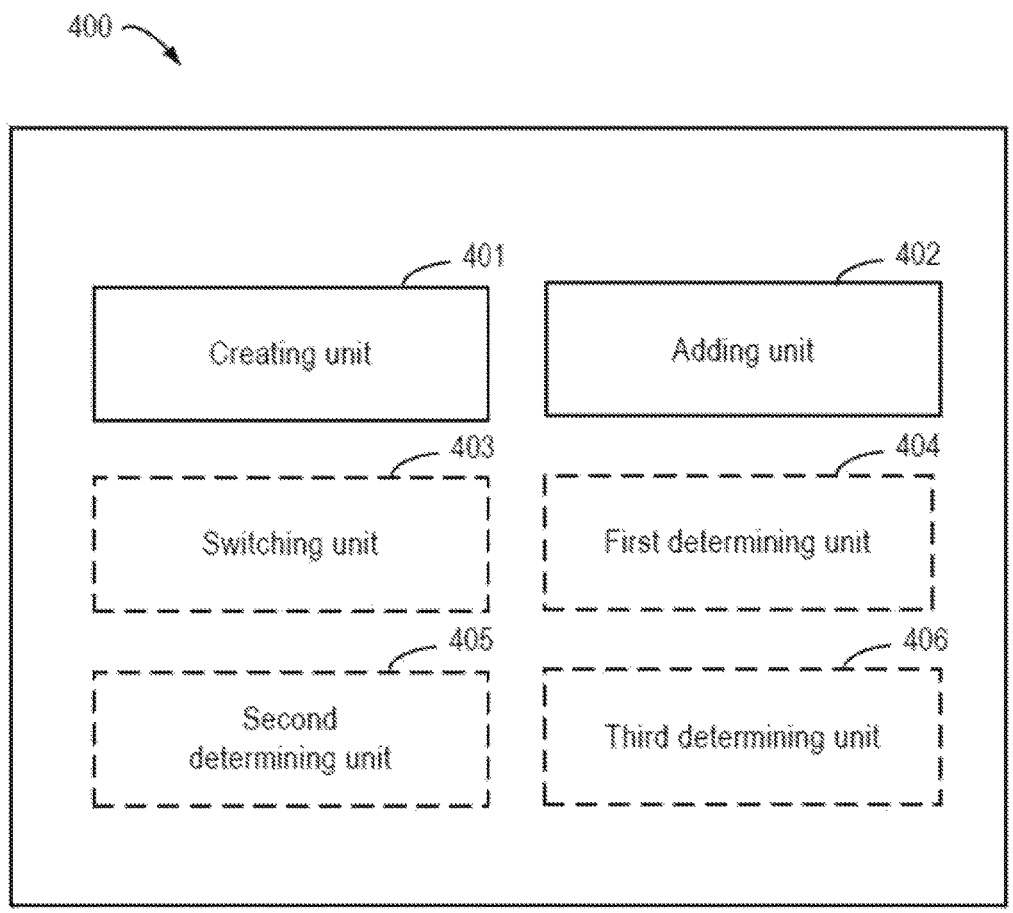
FIG. 4 schematically illustrates a block diagram of an apparatus for a storage system according to an embodiment of the present disclosure.

FIG. 4 schematically illustrates a block diagram of an apparatus 400 for a storage system according to an embodiment of the present disclosure. In the block diagram as shown in FIG. 4, dotted-line boxes are used to represent optional units or components. Those skilled in the art may understand that FIG. 4 only shows units or components in the apparatus 400 closely related to the present disclosure. In specific practice, the apparatus 400 may include other functional units or components that enable it to operate normally. In addition, units or components shown in FIG. 4 may be in necessary connection relations, but FIG. 4 does not describe these connection relations for the sake of brevity.

As described above, the storage system to which the apparatus 400 is directed includes an active storage site and a standby storage site. A logical unit number LUN for the storage pool of the active storage site is replicated to a LUN for the storage pool of the standby storage site to form a consistency group.

As shown in FIG. 4, the apparatus 400 includes a creating unit 401 and an adding unit 402. The creating unit 401 is configured to create a first LUN and a second LUN as mirrors of each other at the active storage site and the standby storage site, respectively. The adding unit 402 is configured to add the mirrors formed by the first LUN and the second LUN into the consistency group. The adding unit 402 is further configured to, after the second LUN is added into the storage pool of the standby storage site, add the first LUN into the storage pool of the active storage site.

In some embodiments, the apparatus 400 may further include: a switching unit 403 configured to, in response to the active storage site becoming unavailable, change an originally active LUN in the consistency group to be a standby LUN and change an originally standby LUN to be an active LUN.

In some embodiments, the apparatus 400 may further include: a first determining unit 404 configured to, before adding the mirrors formed by the first LUN and the second LUN into the consistency group, determine that the first LUN and the second LUN are synchronized.

In some embodiments, the apparatus 400 may further include: a second determining unit 405 configured to, before adding the second LUN into the storage pool of the standby storage site, determine that the mirrors have been added into the consistency group.

In some embodiments, the apparatus 400 may further include: a third determining unit 406 configured to, before adding the first LUN into the storage pool of the active storage site, determine that the second LUN has been added into the storage pool of the standby storage site.

In some embodiments, the storage system may be a network-attached storage NAS system. In some embodiments, the storage pools may include at least one of: a virtual NAS server, a file system, a snapshot, and a network configuration.

Figure 5:
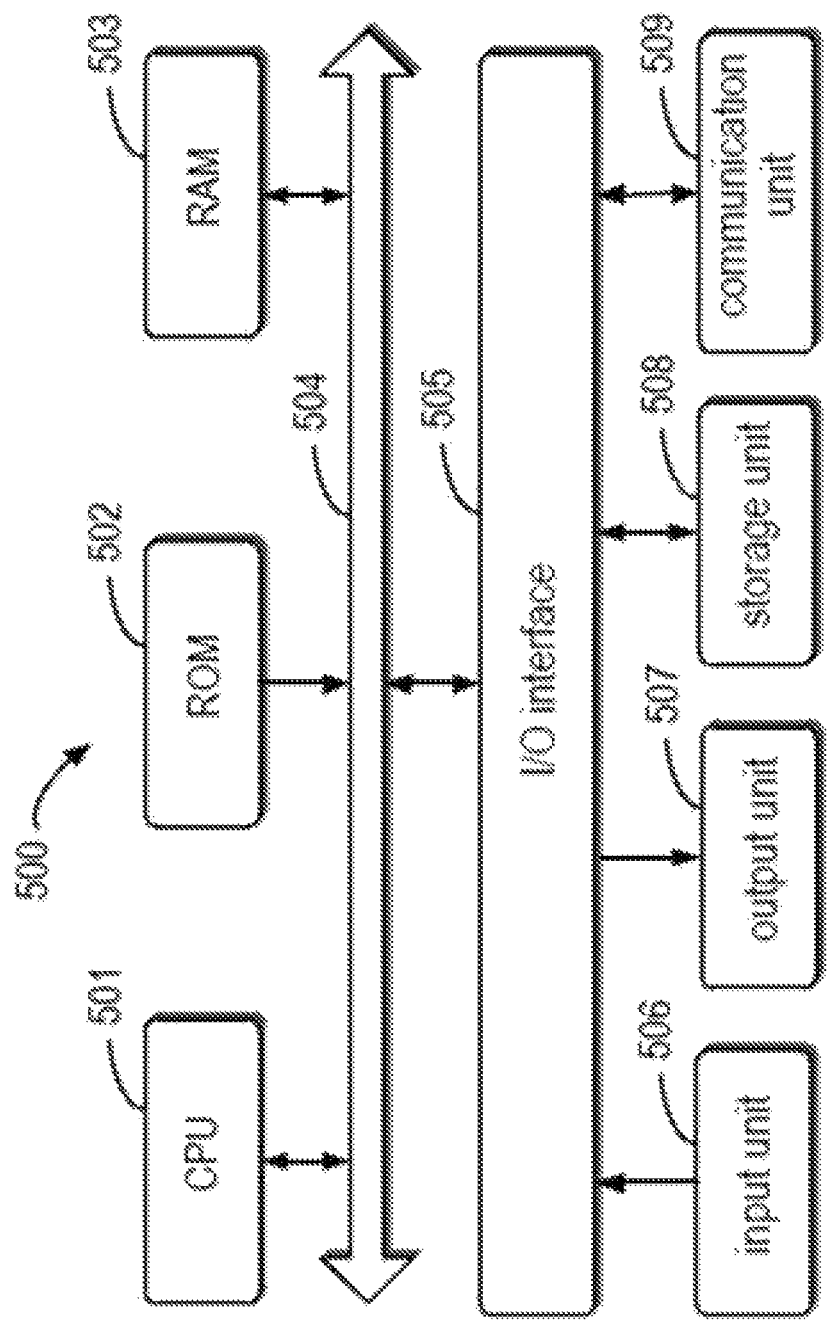
FIG. 5 schematically illustrates a block diagram of a device that may be used to implement an embodiment of the present disclosure.

FIG. 5 schematically illustrates a block diagram of a device 500 that may be used to implement an embodiment of the present disclosure. As shown in FIG. 5, the device 500 includes a central processing unit (CPU) 501 which is capable of performing various actions and processes in accordance with computer program instructions stored in a read only memory (ROM) 502 or computer program instructions loaded from a storage unit 508 to a random access memory (RAM) 503. In the RAM 503, various programs and data needed by operation of the device 500 might be stored. The CPU 501, the ROM 502 and the RAM 503 are connected to one another via a bus 504. An input/output (I/O) interface 505 is also connected to the bus 504.

Multiple components in the device 500 are connected to the I/O interface 505: an input unit 506 including a keyboard, a mouse or the like; an output unit 507 such as various displays, loudspeaker or the like; the storage unit 508 such as a magnetic disk, optical disk or the like, and a communication unit 509 such as a network card, a modem, a wireless communication transceiver, or the like. The communication unit 509 permits the device 500 to exchange information/data with other devices through for example a computer network such as the Internet and/or various communication networks.

The processes and processing described above, for example, method 200, may be implemented by a processing unit 501. For example, in some embodiments, the method 200 may be implemented as a computer software program which is tangibly included in a machine-readable medium, for example the storage unit 508. In some embodiments, a part or entirety of the computer program may be loaded and/mounted on the device 500 via the ROM 502 and/or communication unit 509. When the computer program is loaded to the RAM 503 and implemented by the CPU 501, it may execute one or more steps of the method 200 described above.

In the description of the embodiments of the present disclosure, the term "comprise" and like wording should be understood to be open-ended, i.e., to mean "including but not limited to." The term "based on" should be understood as "at least partially based on." The term "an embodiment" or "the embodiment" should be understood as "at least one embodiment."

It should be appreciated that embodiments of the present disclosure may be implemented by hardware, software or a combination of the software and combination. The hardware part may be implemented using a dedicated logic; the software part may be stored in the memory, executed by an appropriate instruction executing system, e.g., a microprocessor or a dedicatedly designed hardware. Those ordinary skilled in art may understand that the above apparatus and method may be implemented using a computer-executable instruction and/or included in processor control code. In implementation, such code is provided on a medium such as a programmable memory, or a data carrier such as optical or electronic signal carrier.

In addition, although operations of the present methods are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, or a step may be divided into a plurality of steps for execution. It should be appreciated that features and functions of two or more devices according to the present disclosure may be embodied in one device. On the contrary, features and functions of one device as depicted above may be further divided into and embodied by a plurality of devices.

Although the present disclosure has been depicted with reference to a plurality of embodiments, it should be understood that the present disclosure is not limited to the disclosed embodiments. The present disclosure intends to cover various modifications and equivalent arrangements included in the spirit and scope of the appended claims.

We claim:

1. A method for a storage system, the storage system including an active storage site and a standby storage site, a logical unit number (LUN) for a storage pool of the active storage site being replicated, during a functioning remote replication session, to a LUN for a storage pool of the standby storage site, at least the LUN for the storage pool of the active storage site and the LUN for the storage pool of the standby storage site forming a consistency group, the method comprising:

creating, using one or more processors and memory, a mirror relationship between a first LUN at the active storage site and a second LUN at the standby storage site;

adding the first LUN and the second LUN in the mirror relationship into the consistency group; and having added the first LUN and the second LUN in the mirror relationship into the consistency group, extending the storage pool of the active storage site while keeping the remote replication session functioning, the extending of the storage pool of the active storage site including (i) adding the second LUN into the storage pool of the standby storage site, and (ii) having added the second LUN into the storage pool of the standby storage site, adding the first LUN into the storage pool of the active storage site.

2. The method according to claim 1, further comprising:
in response to the active storage site becoming unavailable, changing an originally active LUN in the consistency group to be a standby LUN and changing an originally standby LUN to be an active LUN.

3. The method according to claim 1, further comprising:
before adding the first LUN and the second LUN in the mirror relationship into the consistency group, determining that the first LUN and the second LUN are synchronized.

4. The method according to claim 1, further comprising:
before adding the second LUN into the storage pool of the standby storage site, determining that the first LUN and the second LUN in the mirror relationship have been added into the consistency group.

5. The method according to claim 1, further comprising:
before adding the first LUN into the storage pool of the active storage site, determining that the second LUN has been added into the storage pool of the standby storage site.

6. The method according to claim 1, wherein the storage system is a network-attached storage (NAS) system.

7. The method according to claim 6, wherein each of the storage pool of the active storage site and the storage pool of the standby storage site includes at least one of:
a virtual NAS server, a file system, a snapshot, and a network configuration.

8. A system, comprising:
a storage system including an active storage site and a standby storage site;
a logical unit number (LUN) for a storage pool of the active storage site being replicated, during a functioning remote replication session, to a LUN for a storage pool of the standby storage site, at least the LUN for the storage pool of the active storage site and the LUN for the storage pool of the standby storage site forming a consistency group; and computer-executable program logic encoded in memory of one or more computers using the storage system, wherein the computer-executable program logic is configured for the execution of:

creating, using one or more processors and memory, a mirror relationship between a first LUN at the active storage site and a second LUN at the standby storage site;

adding the first LUN and the second LUN in the mirror relationship into the consistency group; and having added the first LUN and the second LUN in the mirror relationship into the consistency group, extending the storage pool of the active storage site while keeping the remote replication session functioning, the extending of the storage pool of the active storage site including (i) adding the second LUN into the storage pool of the standby storage site, and (ii) having added the second LUN into the storage pool of the standby storage site, adding the first LUN into the storage pool of the active storage site.

9. The system of claim 8, wherein the computer-executable program logic is further configured for the execution of:
in response to the active storage site becoming unavailable, changing an originally active LUN in the consistency group to be a standby LUN and changing an originally standby LUN to be an active LUN.

10. The system of claim 8, wherein the computer-executable program logic is further configured for the execution of:
before adding the first LUN and the second LUN in the mirror relationship into the consistency group, determining that the first LUN and the second LUN are synchronized.

11. The system of claim 8, wherein the computer-executable program logic is further configured for the execution of:
before adding the second LUN into the storage pool of the standby storage site, determining that the first LUN and the second LUN in the mirror relationship have been added into the consistency group.

12. The system of claim 8, wherein the computer-executable program logic is further configured for the execution of:
before adding the first LUN into the storage pool of the active storage site, determining that the second LUN has been added into the storage pool of the standby storage site.

13. The system of claim 8, wherein the storage system is a network-attached storage (NAS) system.

14. The system of claim 13, wherein each of the storage pool of the active storage site and the storage pool of the standby storage site includes at least one of:
a virtual NAS server, a file system, a snapshot, and a network configuration.

15. A computer program product for a storage system, the storage system including an active storage site and a standby storage site, a logical unit number (LUN) for a storage pool of the active storage site being replicated, during a functioning remote replication session, to a LUN for a storage pool of the standby storage site, at least the LUN for the storage pool of the active storage site and the LUN for the storage pool of the standby storage site forming a consistency group, the computer program product comprising:

a non-transitory computer readable medium encoded with computer-executable code, the code configured to enable the execution of:

creating, using one or more processors and memory, a mirror relationship between a first LUN at the active storage site and a second LUN at the standby storage site;

adding the first LUN and the second LUN in the mirror relationship into the consistency group; and having added the first LUN and the second LUN in the mirror relationship into the consistency group, extending the storage pool of the active storage site while keeping the remote replication session functioning, the extending of the storage pool of the active storage site including (i) adding the second LUN into the storage pool of the standby storage site, and (ii) having added the second LUN into the storage pool of the standby storage site, adding the first LUN into the storage pool of the active storage site.

16. The computer program product of claim 15, wherein the code is further configured to enable the execution of:
in response to the active storage site becoming unavailable, changing an originally active LUN in the consistency group to be a standby LUN and changing an originally standby LUN to be an active LUN.

17. The computer program product of claim 15, wherein the code is further configured to enable the execution of:
before adding the first LUN and the second LUN in the mirror relationship into the consistency group, determining that the first LUN and the second LUN are synchronized.

18. The computer program product of claim 15, wherein the code is further configured to enable the execution of:
before adding the second LUN into the storage pool of the standby storage site, determining that the first LUN and the second LUN in the mirror relationship have been added into the consistency group.

19. The computer program product of claim 15, wherein the code is further configured to enable the execution of:
before adding the first LUN into the storage pool of the active storage site, determining that the second LUN has been added into the storage pool of the standby storage site.

20. The computer program product of claim 15, wherein the storage system is a network-attached storage (NAS) system.

* * * * *